United States Patent
Billman et al.

(10) Patent No.: US 12,150,587 B1
(45) Date of Patent: Nov. 26, 2024

(54) FORMED PRODUCT GRILL

(71) Applicant: Omar Associates, LLC, Omar, OH (US)

(72) Inventors: Chad W. Billman, Sandusky, OH (US); Eric J. Wise, Monroeville, OH (US); Christopher J. Huss, Republic, OH (US)

(73) Assignee: Omar Associates, LLC, Omar, OH (US)

( * ) Notice: Subject to any disclaimer, the term of this patent is extended or adjusted under 35 U.S.C. 154(b) by 882 days.

(21) Appl. No.: 17/243,668

(22) Filed: Apr. 29, 2021

Related U.S. Application Data (63) Continuation-in-part of application No. 17/154,052, filed on Jan. 21, 2021, now Pat. No. 11,844,456, which is a continuation-in-part of application No. 17/067,702, filed on Oct. 11, 2020, now abandoned.

(60) Provisional application No. 62/914,185, filed on Oct. 11, 2019.

(51) Int. Cl.
| | |
|---|---|
| *A47J 37/04* | (2006.01) |
| *B65G 17/32* | (2006.01) |
| *B65G 17/44* | (2006.01) |
| *B65G 17/46* | (2006.01) |
| *B65G 23/00* | (2006.01) |
| *B65G 17/06* | (2006.01) |
| *B65G 19/24* | (2006.01) |

(52) U.S. Cl.
CPC .......... *A47J 37/044* (2013.01); *B65G 17/326* (2013.01); *B65G 17/44* (2013.01); *B65G 17/46* (2013.01); *B65G 23/00* (2013.01); *B65G 17/067* (2013.01); *B65G 19/245* (2013.01); *B65G 2201/0202* (2013.01)

(58) Field of Classification Search
CPC ..... A47J 37/044; B65G 17/326; B65G 17/44; B65G 17/46; B65G 23/00; B65G 17/067; B65G 19/245; B65G 2201/0202
USPC ...................................... 198/473.1
See application file for complete search history.

(56) References Cited

U.S. PATENT DOCUMENTS

| | | | | |
|---|---|---|---|---|
| 3,811,554 | A * | 5/1974 | Egan .................... | B65G 17/067 198/840 |
| 4,167,999 | A * | 9/1979 | Haggerty ............... | B65G 17/44 198/803.2 |
| 4,224,457 | A * | 9/1980 | Iwao ..................... | C07C 327/00 562/401 |
| 5,065,670 | A * | 11/1991 | Leiweke ................ | B65G 17/44 99/405 |
| 5,630,499 | A * | 5/1997 | Louden .................. | B65G 17/34 198/465.1 |

(Continued)

*Primary Examiner* — Mark A Deuble
(74) *Attorney, Agent, or Firm* — Rankin, Hill & Clark LLP (57) ABSTRACT

A conveyor system includes an upper and lower synchronized conveyors that transfer a food product, such as eggs, through a heating system to cook the food product. The lower conveyor includes a belt and the upper conveyor includes rings that are moveably held within frames. The upper conveyor includes a connection system for removably connecting the frames to drive belts. The rings and belt are brought together to define receptacles in which the food product is arranged during cooking. After cooking, the rings are lifted off of the belt, leaving the food product on the belt. A transfer roller transfers the cooked food product from the belt for further processing, such as freezing of the food product.

20 Claims, 9 Drawing Sheets

(56) References Cited

U.S. PATENT DOCUMENTS

| | | | | |
|---|---|---|---|---|
| 7,325,674 | B2* | 2/2008 | Dufhaus | B65G 17/44 198/867.14 |
| 11,678,674 | B1* | 6/2023 | Taylor | A23P 30/10 425/574 |
| 11,844,456 | B1* | 12/2023 | Billman | B65G 47/57 |
| 2002/0044996 | A1* | 4/2002 | McNeel | A23L 7/13 426/549 |
| 2005/0109422 | A1* | 5/2005 | Duman | B65G 17/36 141/129 |
| 2008/0063777 | A1* | 3/2008 | Roberts | A23L 15/00 426/558 |
| 2009/0120107 | A1* | 5/2009 | Oztas | A23L 3/36 62/340 |
| 2014/0072688 | A1* | 3/2014 | Strand | A23L 3/375 426/531 |

* cited by examiner

FORMED PRODUCT GRILL

CROSS REFERENCE TO RELATED APPLICATION

This application is a continuation-in-part of co-pending U.S. application Ser. No. 17/154,052, filed Jan. 21, 2021, which is a continuation-in-part of co-pending U.S. application Ser. No. 17/067,702, filed Oct. 11, 2020, and claims priority to U.S. Provisional App. Ser. No. 62/914,185, filed Oct. 11, 2019, all of which are expressly incorporated by reference.

BACKGROUND OF INVENTION

Field of Invention

The present invention relates to a conveyor system for heating a food product. More particularly, the present invention relates to a formed product grill, e.g. a grill for cooking egg-based food products, which are formed and cooked to a ready-to-eat condition.

Brief Description of Related Art

Food product belt grills are known, which use two polytetrafluoroethylene ("PTFE", e.g. Teflon®) conveyor belts, one below the food product, and one above, to pinch the food product while being transferred through the grill. Heating platens are located below the bottom belt and above the top belt to transfer heat through the belts by conduction to the food product. The platens are heated by thermal fluid supplied by an outside heating and pumping system. The temperature of the grill is managed by regulating flow and temperature of thermal fluid supplied to the heating platens.

Sunny side up eggs require delicate cooking and handling in order to be cooked to a ready-to-eat condition, frozen, and then packaged for use in restaurants, sandwich assembly, and other applications. All-natural eggs require slow, uniform cooking and specialized guidance during the cooking process to result in a clear, bright egg white and a liquid yolk. To date, mass production of this cooked food product has not been attempted by the industrial food processing industry.

BRIEF SUMMARY OF THE INVENTION

In one aspect, a ring assembly includes a frame and rings. The frame includes bars. The bars include two spaced-apart lateral bars connected by a series of spaced-apart longitudinal bars. The bars define square openings. The rings are moveably held within the openings. Each of the rings defining an open top and an open bottom.

In another aspect, a conveyor system for heating a food product includes a feed end and an opposite discharge end, a belt, a frame, a plurality of molds, and a heating system. The belt is configured to be moved in a first direction from the feed end toward the discharge end. Each of the molds includes an open bottom. The frame defines openings, each of which moveably hold one of the molds. The frame is configured to move in the first direction and toward the belt such that the open bottom of each of the molds contacts the belt so as to define a receptacle between each of the molds and the belt. The receptacle is configured to contain the food product during heating of the food product and to provide a shape to the heated food product. The heating system is configured to heat the food product in the receptacle.

In another aspect, a method of preparing a cooked food product includes providing a conveyor system including a belt, a frame, molds, and a heating system. Each of the molds is moveably held within an opening in the frame and includes an open bottom. The method includes moving the frame such that the open bottom of each of the molds contacts the belt to thereby form a plurality of receptacles. The food product is arranged in the receptacles and is cooked in the receptacles by heat provided from the heating system. The frame is then moved such that the molds do not contact the belt, thereby leaving the cooked food product on the belt.

DETAILED DESCRIPTION OF THE INVENTION

The present subject matter relates to a conveyor system 2 (also referred to herein as "conveyor assembly") having a feed end 4 and an opposite discharge end 6. The conveyor system 2 includes a lower conveyor 8 and an upper conveyor 10 and is configured to heat a food product 70, for example an egg-based food product. The conveyor system 2 may continuously operate to prepare sunny side up eggs. The cooked eggs may be frozen and packaged for later consumption. Operation of the conveyor system 2 will be discussed with respect to cooking eggs as the food product 70, but this is not required, and it should be appreciated that other food products can be cooked using the conveyor system 2.

1. Lower Conveyor.

Figure 1:
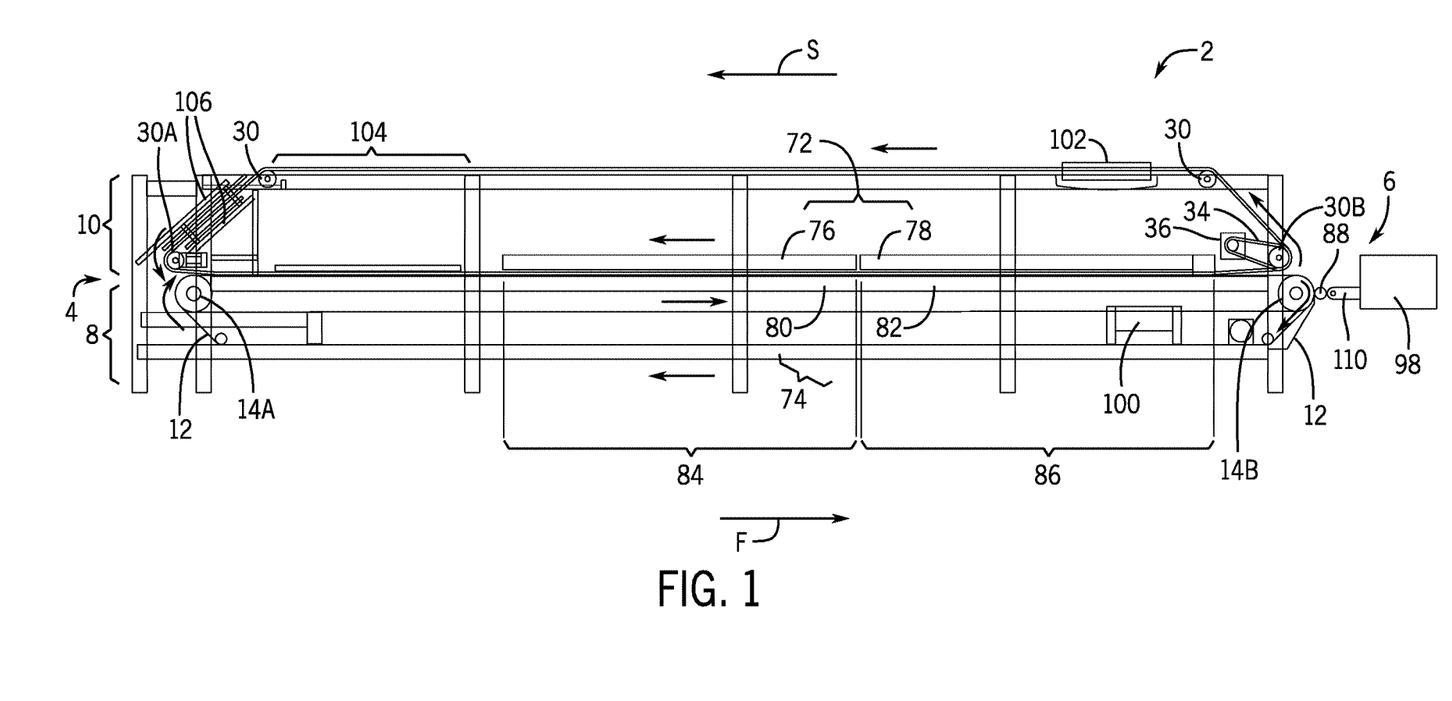
FIG. 1 is a schematic side view of a conveyor system in accordance with the present subject matter.

The lower conveyor 8 includes a belt 12 that rotates around a first curved path (indicated by the lower set of arrows in FIG. 1) between the feed end 4 and the discharge end 6. The belt 12 may be guided by rollers 14 along the first curved path. The rollers 14 may include a large diameter feed end roller 14A that is also used to tension the belt 12, and a large diameter discharge end roller 14B that also serves to drive the belt 12 by friction along the first curved path. Friction between the discharge end roller 14B and the belt 12 is increased by the tension applied by the feed end roller 14A. The belt 12 may be non-stick, and may include a 0.012" thick, flat, PTFE conveyor belt. Other materials, such as silicon, may be used to form or coat the belt 12. The belt 12 is flat, and is joined together at the ends using an arrow finger style splice to make an endless/continuous loop. The arrow finger splice creates a flat surface at the joint to enable the molds 20 to sit flat across the splice joint.

2. Upper Conveyor.

The upper conveyor 10 includes a ring assembly including one or more frames 16, each of which define openings 18, and a plurality of molds 20 (also referred to herein as "rings"). The molds 20 are operatively connected with the frame 16 in that each one of the molds 20 is movably held (i.e. trapped) within one of the openings 18. As such, movement of the frame 16 along a second curved path (indicated by the upper set of arrows in FIG. 1) between the feed end 4 and the discharge end 6 also causes the molds 20 to move along the second curved path.

Figure 2:
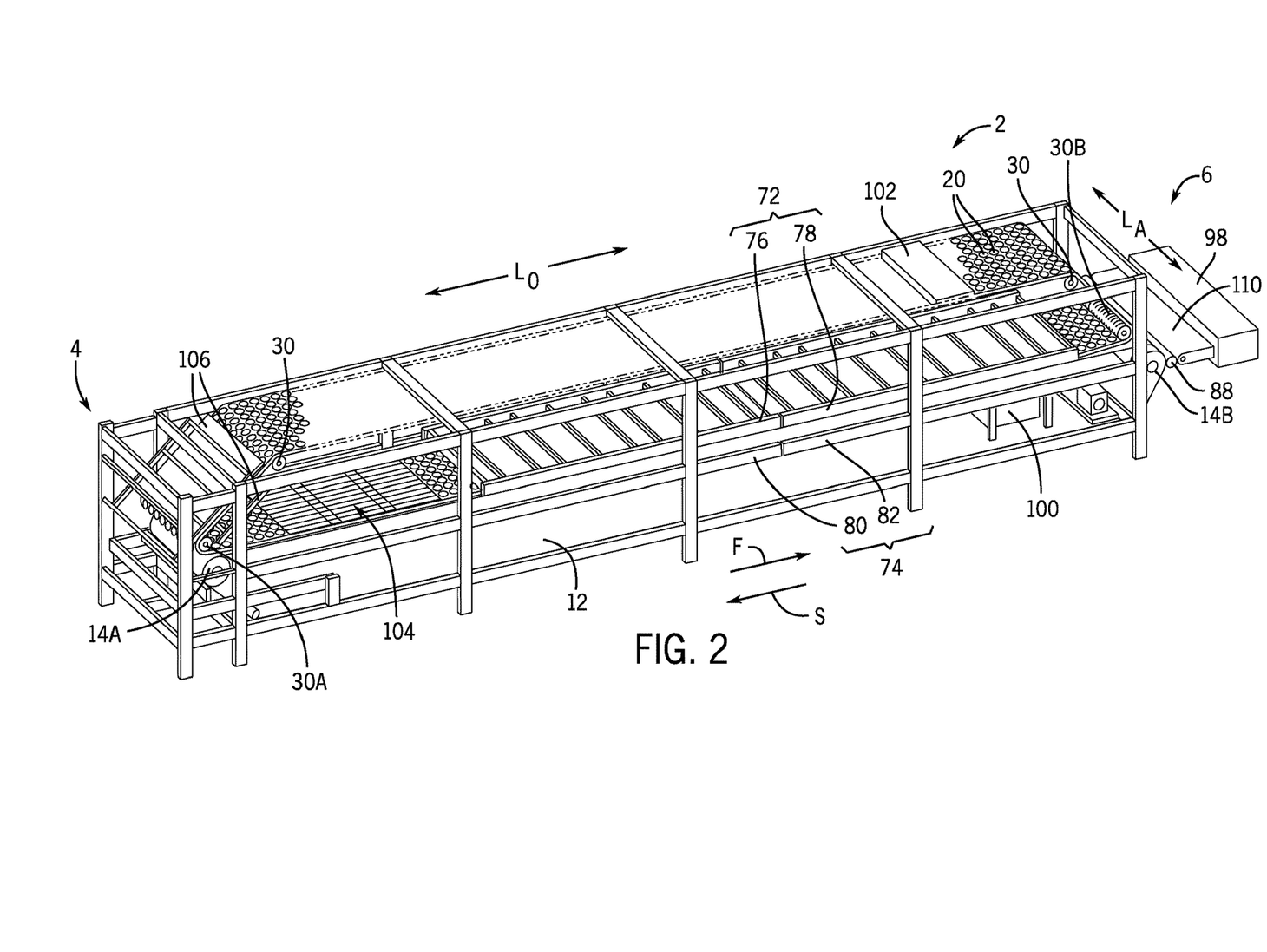
FIG. 2 is a schematic perspective view of the conveyor system in accordance with the present subject matter.

The frames 16 each include a network of bars 22 connected together to define the openings 18. Two lateral bars 22A of each frame 16 extend in a lateral direction $L_A$ (see FIG. 2) of the conveyor system 2 across a width of the conveyor system 2, and spaced-apart longitudinal bars 22B extend in a longitudinal direction $L_o$ (see FIG. 2) of the conveyor system 2 along a length of the conveyor system 2. The two lateral bars 22A of each frame 16 are spaced apart and may be parallel to each other, and are connected by a series of the longitudinal bars 22B, which are spaced apart and may be parallel to each other, to thereby form the openings 18. The lateral bars 22A are longer than the longitudinal bars 22B, and both the lateral bars 22A and longitudinal bars 22B can be fabricated from round stock or stock having another cross-section shape.

The openings 18 are shown to each have a square or rectangular shape, however this is not required and the openings 18 can have other shapes. The length of the lateral bars 22A, the length and number of longitudinal bars 22B, and the number and size of the openings 18 on each frame 16 are not critical and can be varied for a particular application as desired. The frames 16 may form a regular grid pattern of openings 18.

Figure 3:
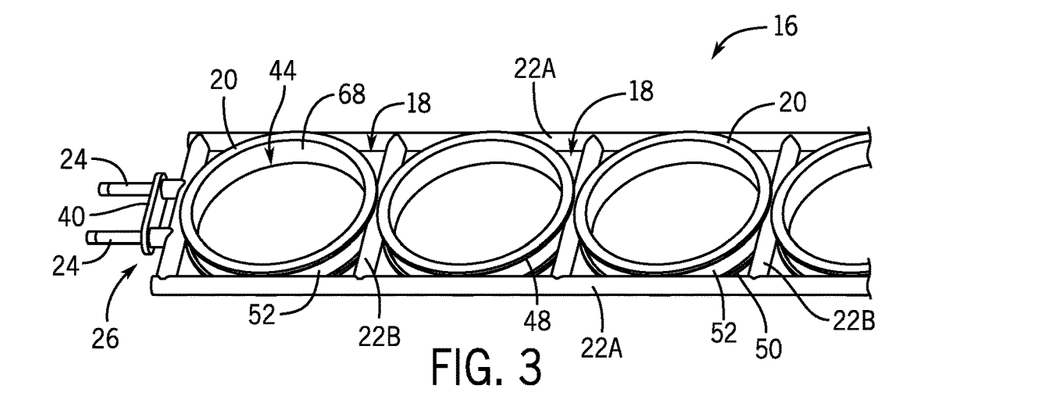
FIG. 3 is a perspective view of a portion of ring assembly in accordance with the present subject matter.
Figure 4:
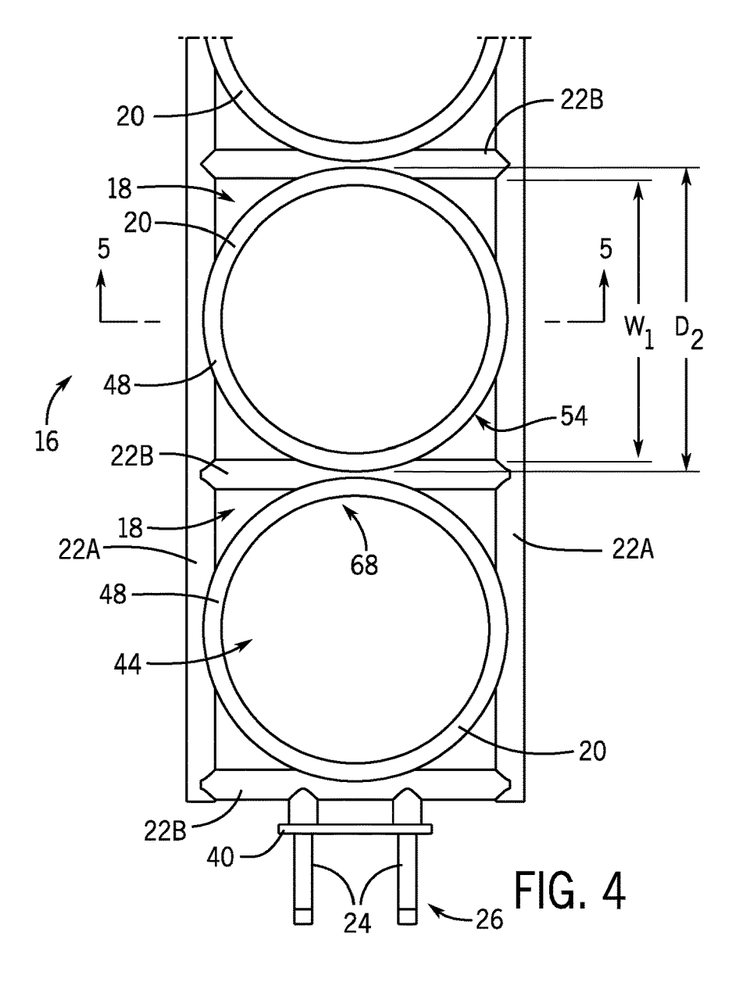
FIG. 4 is a top view of the portion of the ring assembly of FIG. 3.

The frames 16 each include four pins 24, two of which extend from each lateral end 26 of the frame 16 (one lateral end 26 shown in FIGS. 3 and 4). The two pins 24 on each lateral end 26 extend from a terminal lateral longitudinal bar 22B. The four pins 24 on each frame 16 act to operatively connect each frame 16 to two endless/continuous drive chains 28, one of the chains 28 arranged on each lateral end 26 of the frames 16. The drive chains 28 are parallel to each other and are driven around the second curved path between the feed end 4 and the discharge end 6, which causes the frames 16 and molds 20 to also move around the second curved path. The drive chains 28 may be roller chains and can be guided/deflected along the second curved path by rollers 30 and guides 32, and driven by a discharge end drive roller 30B, which is turned by a second drive chain 34 that is driven by a drive motor 36. The two pins 24 on each lateral end 26 of the frame 16 may act as link pins of a link 38 of the drive chains 28. The frames 16 may also include a plate 40, which similar to the pins 24, acts a plate of a link 38 of the drive chains 28. The conveyor system 2 may use a band or belt, instead of the drive chains 28, to drive the frames 16 around the second curved path.

If the pins 24 are permanently attached to the frames 16, such as if they have a one-piece construction with the frame 16, then disconnecting a frame 16 from the drive chains 28 (e.g. for repair, replacement, or modification) would require the pins 24 to be disconnected from the drive chains 28. This disconnection would require the drive chains 28 to be bowed out in the lateral direction $L_A$ so that the pins 24 on both ends of the frame 16 could be moved out of the respective holes in the links 38 so as to be disengaged with the links 38.

Removing a frame 16 from the drive chains 28 would therefore require a certain amount of time and labor and would require the drive chains 28 to be broken at that link 38 where the frame 16 is to be removed. Such disconnection of the frame 16 from the drive chains 28 would also result in two immediately adjacent links 38 in each of the drive chains 28 being disconnected from each other (i.e. the chain 28 being broken) due to the removal of the two pins 24 from the drive chains 28. This would result in the drive chains 28 being broken at that location where the frame 16 was removed. As such, operation of the conveyor system 2 would not be possible with these broken drive chains 28. Moreover, inserting another frame or a repaired frame 16 back into the conveyor system 2 would require the pins 24 on the inserted frame 16 being arranged back into the respecting holes in the links 38, which would require proper alignment of the holes and pins 24, and thus further work.

In order to simplify this process and save on time and labor of disconnecting frames 16 from the drive chains 28, the pins 24 may be removably attached to the frames 16. This would allow the frames 16 to be removed from the drive chains 28 without also having to remove the pins 24 from the drive chains 28, and thus without the drive chains 28 being broken.

Figures 13, 14:
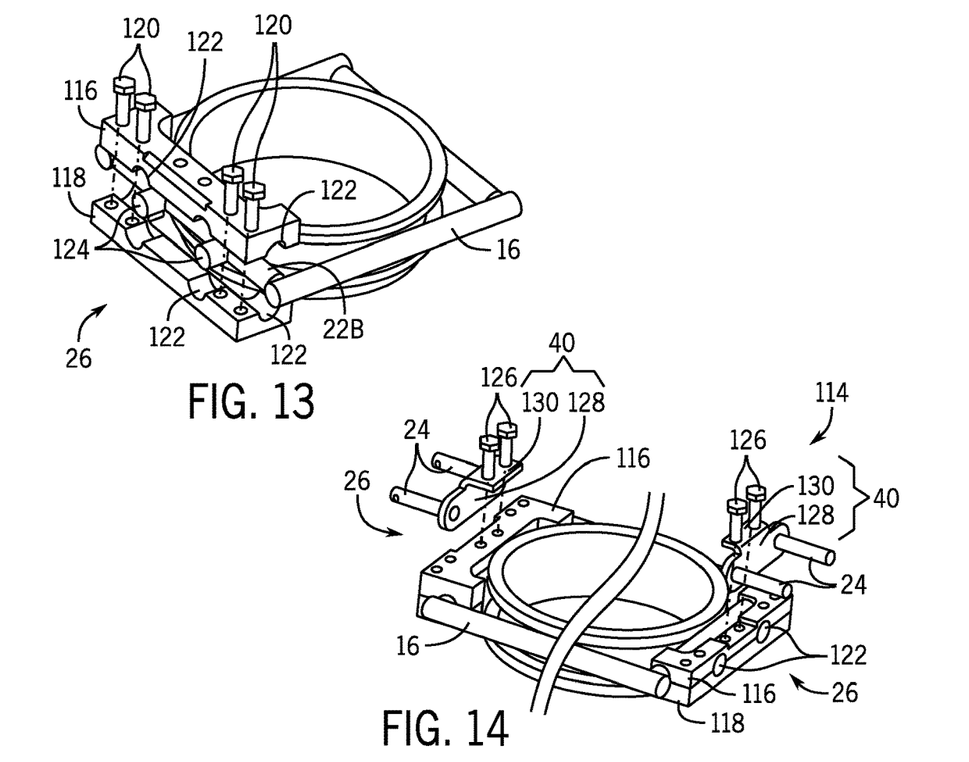
FIG. 13 is a perspective view of a connection system in accordance with the present subject matter.
FIG. 14, is a perspective view of a connection system in accordance with the present subject matter.
Figure 15:
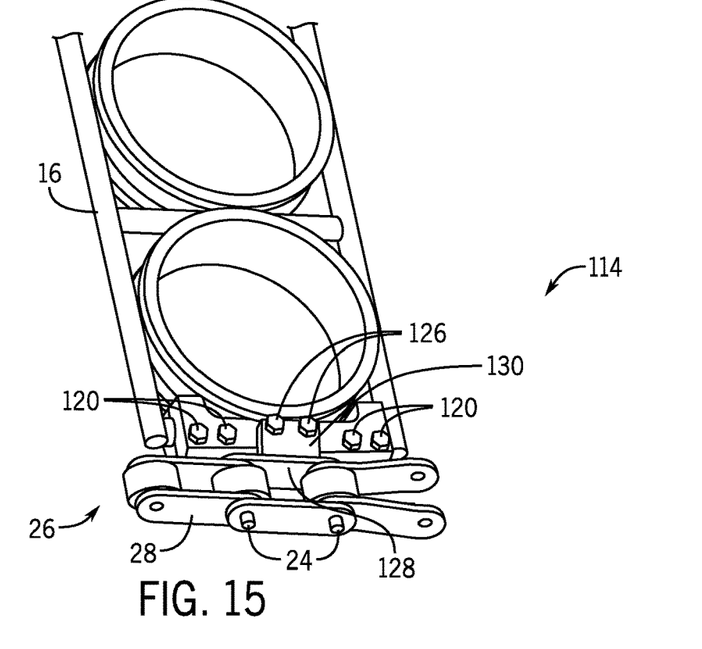
FIG. 15 is a perspective view of a connection system in accordance with the present subject matter.

With reference to FIGS. 13-15, the frames 16 may be removably connected to the drive chains 28 by a connection system 114 including, for each lateral end 26 of the frames 24, an upper clamp 116, a lower clamp 118, the plate 40, and the two pins 24. The upper and lower clamps 116, 118 can be connected together by a connector, e.g. clamping screws 120, to thereby clamp the frame 16 between them.

The clamps 116, 118 may include corresponding grooves 122 that mate together and collectively form tunnels when the clamps 116, 118 are clamped around the frame 16, and the tunnels accommodate and fit around a portion of the frames 16. For example, the longitudinal bar 22B and two studs 124 at the lateral end 26 of the frame 16 may fit into the tunnels formed by the mated grooves 122 of the clamps 116, 118. The clamping screws 120 may screw into the clamps 116, 118 and thus secure the upper and lower clamps 116, 118 together and around the longitudinal bar 22B and two studs 124. For example, the clamping screws 120 may pass through the upper clamp 116 and thread into the lower clamp 118. The two studs 124, each being arranged in tunnel, may offer a resistance to rotation of the secured clamps 116, 118 around the longitudinal bar 22B. The clamps 116, 118 may be removably attached to the frame 16 using the clamping screws 120, or may be permanently attached to the frame 16, e.g. by welding.

In this connection system 114 of FIGS. 13-15, the pins 24 are mounted on the plate 40, and the plate 40 is removably connected to the upper clamp 116 by a connector, e.g. mounting screws 126. The plate 40 has a lower vertical section 128 and an upper horizontal section 130. The pins 24 extend out horizontally from the vertical section 128, and the two mounting screws 126 are inserted down through the horizontal section 130 and anchored (e.g. threaded) in the upper clamp 116, thereby removably connecting the plate 40 to the upper clamp 116.

When it is desired to remove a frame 16 from the drive chains 28 for repair, cleaning, replacement, modification or otherwise, the two mounting screws 126 are removed from the upper clamp 116 and the horizontal section 130. This allows the frame 16 and clamps 116, 118 to be removed from the plate 40 and pins 24, and thus from the drive chains 28. At the same time, it keeps the pins 24 in the drive chains 28, thus keeping the drive chains 28 unbroken and still functional and thus able to move the remaining frames still connected thereto, but at the same time allowing the disconnected frame 16 to be removed from the drive chains 28. The frame 16 may be removed from the drive chains 28 so as to modify the frame 16 or mold(s) 20 held by the frame 16. This may be done, for example, to change out one or more of the molds 20 held by the frame 16, tighten the clamping screws 120, washing the frame 19 or molds 20, or for other reasons as desired. This may be done to provide a replacement mold(s) in the frame 16 that has a different size, shape, material composition, etc. than the replaced mold 20.

The molds 20 each include an endless round vertical side wall 42 defining an open top 44 and an open bottom 46. The molds 20 each include a top flange 48 and a bottom flange 50 that extend horizontally out from the side wall 42 to thereby define an annular groove 54 between them and at the outside 54 of the side wall 42. The top flange 48 may extend out at the top edge 56 of the side wall 42, and the bottom flange 50 may extend out at a bottom edge 58 of the side wall 42.

Figure 5:
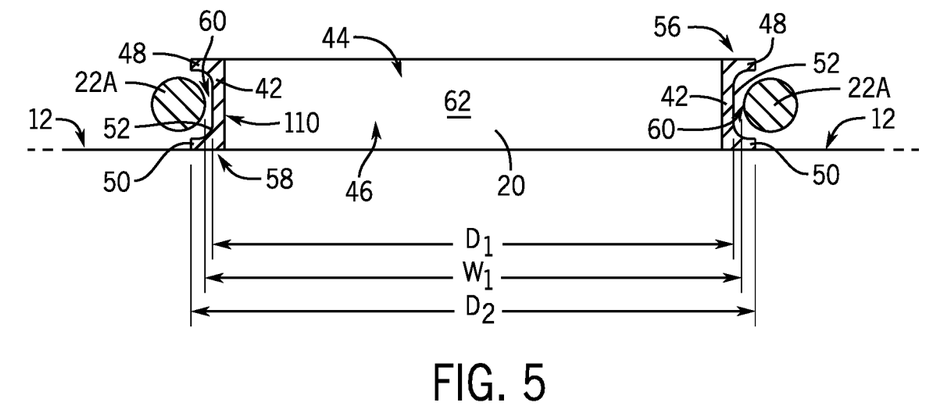
FIG. 5 is a cross-section view taken along arrows 5-5 from FIG. 4.
Figure 6:
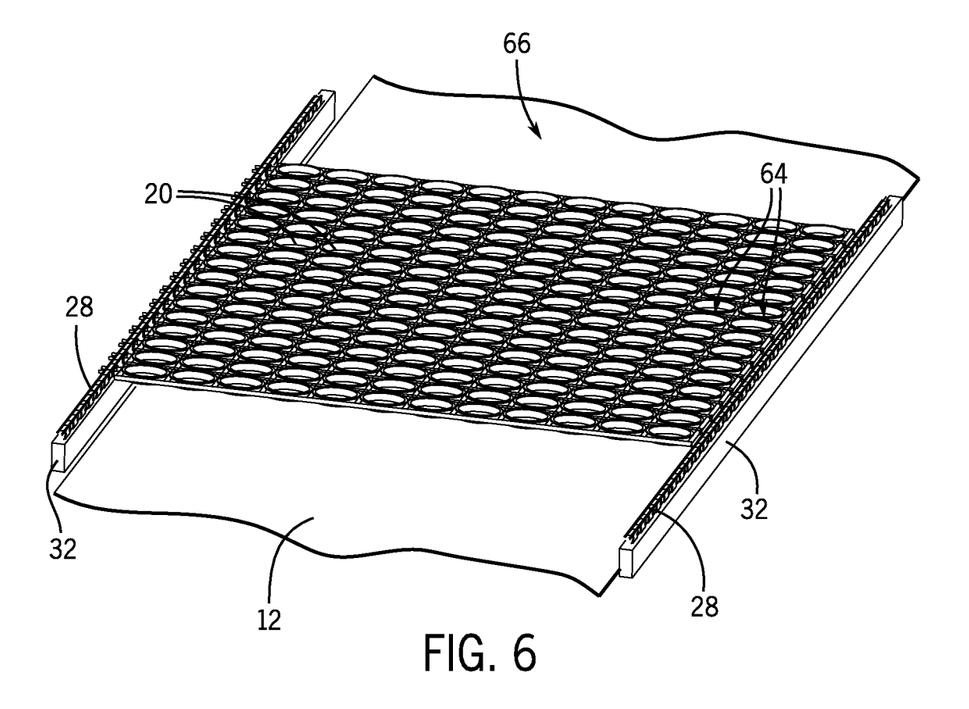
FIG. 6 is a perspective view showing a loading section of a conveyor system accordance with the present subject matter.

Each of the openings 18 between the two lateral bars 22A and two adjacent longitudinal bars 22B movably hold one of the molds 20, which configuration is accomplished by some of the bars 22 being arranged at least partially within the groove 52 of the mold 20. In particular, as shown in FIG. 5, a width $W_1$ of the opening 18 (i.e. a distance between the lateral bars 22A) is larger than a diameter $D_1$ of the groove 52 but smaller than a diameter $D_2$ of the flanges 48, 50 so as to provide a gap 60 between the mold 20 and the lateral bars 22A. The gap 60 may be ¼" to ¹⁄₁₆", or ⅛", i.e. the width $W_1$ may be ¼" to ¹⁄₁₆", or ⅛" larger than the diameter $D_1$. The diameter $D_2$ may be ¹⁄₁₆" larger than the width $W_1$. As such, the molds 20 are prevented from escaping from the openings 18 in the frame 16 because the two lateral bars 22A are arranged at least partially within the groove 52 of the mold 20 and are prevented from escaping the groove 52 due to the flanges 48, 50. In a similar manner, the longitudinal bars 22B may also be arranged at least partially within the groove 52 of the mold 20 in the same manner as the lateral bars 22A shown in FIG. 5, such that four of the bars 22 (two lateral bars 22A and two of the longitudinal bars 22B) are arranged at least partially within the groove 52.

The molds 20 and the frame 16 may be made from stainless steel, and one or both can be coated with silicone or PTFE (e.g. Teflon®) to improve food product release characteristics. The molds 20 may be made or coated with other material, including for example, silicone, which may be molded to form the molds 20. The molds 20 may be machined, molded, or otherwise formed into a ring shape, having a smooth inner surface 68, e.g. that can be polished (e.g. electro-polished), in order to inhibit food product 70 from sticking thereto.

The molds 20 being loosely (i.e. movably) held by the frame 16 within the openings 18 allows for a certain amount of "play" between the molds 20 and the frame 16, i.e. a certain amount or degree of movement is provided between the molds 20 relative to the frame 16 and openings 18. More specifically, the molds 20 may move vertically and horizontally with respect to the frame 16 and openings 18 to an extent allowed by the gap 60 between the molds 20 and the bars 22, yet at the same time be operatively connected to the frame 16 because the molds 20 cannot escape from the openings 18 because such escape is prevented by the flanges 48, 50 being larger than the openings 18.

Figure 7:
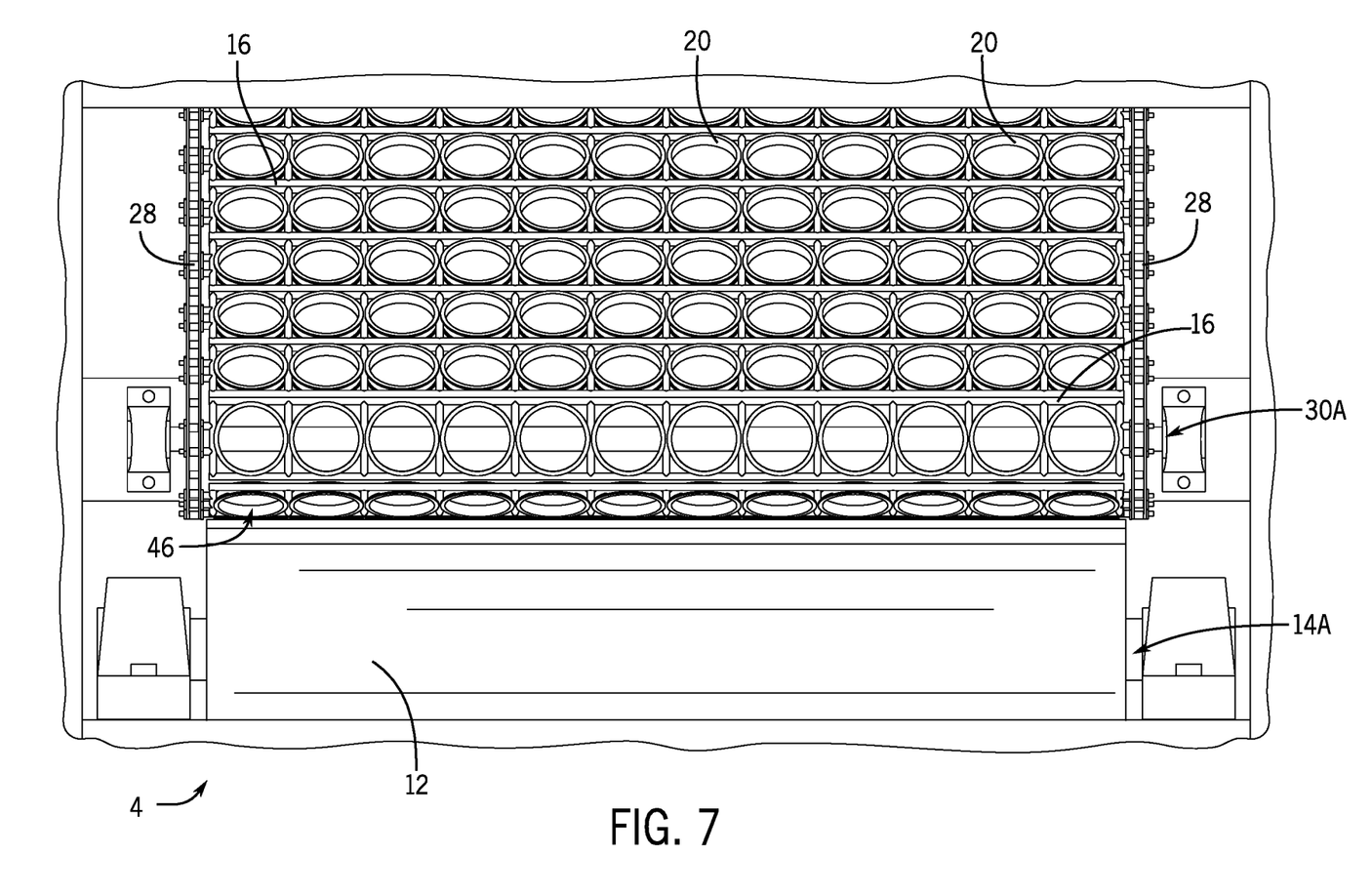
FIG. 7 is a back view showing a feed end of a conveyor system in accordance with the present subject matter.

The conveyor system 2 is configured such that the lower conveyor 8 and the upper conveyor 10 are brought together at the feed end 4 (FIG. 7) such that the molds 20 of the upper conveyor 10 contact the belt 12 of the lower conveyor 8 so as to define a receptacle 64 between each of the molds 20 and the belt 12. The receptacles 64 are moved in a feed path in the first direction F by the lower conveyor 8 and the upper conveyor 10 being moved together along a first direction F toward the discharge end 6 and through a heating system of the conveyor system 2. The movement of the lower conveyor 8 and the upper conveyor 10 may be synchronized so that the belt 12 and the molds 20 move at the same speed in the first direction F. When the lower conveyor 8 and the upper conveyor 10 are brought together, the play between the molds 20 and the frame 16 allow the molds 20 to lay flat on the upper surface 66 of the belt 12, even if the upper surface 66 is not completely parallel with the frame 16 or even if the frame 16 is suspended above the belt 12 by a certain distance. This amount of play between the molds 20 and the frames 16 thus allows the molds 20 to lay firmly against the upper surface 66 of the belt 12 and ensures a seal is formed between the bottom surface of the molds 20 and the upper surface 66 of the belt 12. This seals off the interior of the receptacles 64 to prevent escape of the food product 70 therefrom.

The receptacles 64 are defined by the upper surface 66 of the belt 12 and the inner surface 68 of the molds 20, and are configured to contain a food product 70 (e.g. a raw egg) while the food product 70 is moved in the first direction F and heated (e.g. cooked) by the heating system. The belt 12 may be tracked when moved in the first direction F to be within ⅛" of center to prevent liquid food product 70 from leaking under the molds 20 prior to solidification during heating (cooking). Tracking of the belt 12 is controlled by a three-roller system that steers the belt 12 by increasing or decreasing tension mid-width of the belt material as it is conveyed through the first curved path. The belt 12 is flat and straight to maintain control of the shape of the cooking food product 70 held in the molds 20.

The open bottoms 46 of the molds 20 allow the food product 70 to contact the upper surface 66 of the belt 12. The food product 70, e.g. a raw egg, may also spread out in the receptacles 64 and contact the inner surface 68 of the molds 20, which may provide a shape to the food product 70 as it is cooked. The shape of the cooked food product 70 may therefore be based on the internal shape of the receptacles 64. In other words, the molds 20 and the corresponding receptacles 64 defined by the molds 20, form the food product 70 to have a particular shape when it is cooked. Sunny side up eggs require a structure during cooking in order create a round finished (cooked and ready to eat) product. In the case of the molds 20 being in the shape of a ring, the cooked eggs may have a round outer horizontal edge. The molds 20 may have a different internal shape to provide other formed shapes for the cooked eggs as desired.

3. Heating System.

The heating system is configured to heat the food product 70 from above and/or from below the food product 70 as the food product 70 in the receptacles 64 through the feed path in the first direction F. The molds 20 may also be heated by the heating system. The heating system may heat the food product 70 by any one or more of radiation, conduction, convection.

The heating system may include a thermal radiation unit 72 arranged above the food product 70, and a thermal conduction unit 74 arranged below the food product 70. The thermal radiation unit 72 may be stainless steel and include a first radiant heater 76 and a second radiant heater 78. The first and second conduction heaters 76, 78 may be assembled in a manner that creates a gap between two parallel stainless steel plates with a flow path between the two plates. The flow path begins at one corner of the heaters 76, 78, follows along one side of the heaters 76, 78, then turns 180° to flow in the opposite direction, but parallel to the first path. This is continued until the fluid reaches the corner diagonally opposite to the corner of entry. The flow path is sized to produce the required radiant energy (heat) to cook the product traveling below the heaters 76, 78. The thermal radiation unit 72 may be mounted on mechanical screw jacks to adjust a distance between the thermal radiation unit 72 and the food product 70. This adjustment allows more or less intense heating of the top of the food product 70 and may also allow for cleaning of the conveyor system 2 after a production run.

The thermal conduction unit 74 may be stainless steel and include a first conduction heater 80 and a second conduction heater 82. The first and second conduction heaters 80, 82 may be remote-heated by food-grade fluid that passes through pathways formed by welding gates and patterns inside the heaters 80, 82.

The temperature of the thermal radiation unit 72 and the thermal conduction unit 74 may be independently controlled to produce desired characteristics in the cooked food product 70, which in the case of eggs, may solidify during heating.

The belt 12 is passed across, and rides on top of, the first and second conduction heaters 80, 82. Heat is transferred to the belt 12 through conduction and, consequently, to the food product 70 resting on the top surface 66 of the belt 12 in the receptacles 64.

The food product 70, while being in the receptacles 64 and moved along the feed path, may first move through a first heating zone 84 and then subsequently through a second heating zone 86. In other words, with respect to the first direction F, the first heating zone 84 is before the second heating zone 86. The first heating zone 84 may be hotter (i.e. produce more heat and be at a higher temperature) than the second heating zone 86. The first heating zone 84 may be defined by the first radiation heater 76 and the first conduction heater 80. The second heating zone 86 may be defined by the second radiation heater 78 and the second conduction heater 82. More or less heating zones, units, and heaters may be utilized. The thermal radiation unit 72 heats the food product 70 in the receptacles 64 from above by thermal radiation, where radiant heat is directed from the thermal radiation unit, radiated through air, and downward onto the top of the food product 70. The thermal conduction unit 74 heats the food product 70 in the receptacles 64 from below by thermal conduction, where heat is transmitted from the thermal conduction unit 74, conducted through the belt 12, and into the bottom of the food product 70 on the upper surface 66 of the belt 12.

In the case of a cooked egg, this should rest (e.g., for approximately 45-60 seconds) after reaching the needed core temperature in order to create a homogeneous runny yolk. The heating system may therefore include an insulated hood to retain heat and to allow equilibration of temperature throughout the food product 70. This hood, or tempering chamber, may produce the needed internal temperature to satisfactorily cook the food product 70, for example to reach a critical temperature needed to produce a desired yolk consistency for a sunny side up egg.

Figure 8:
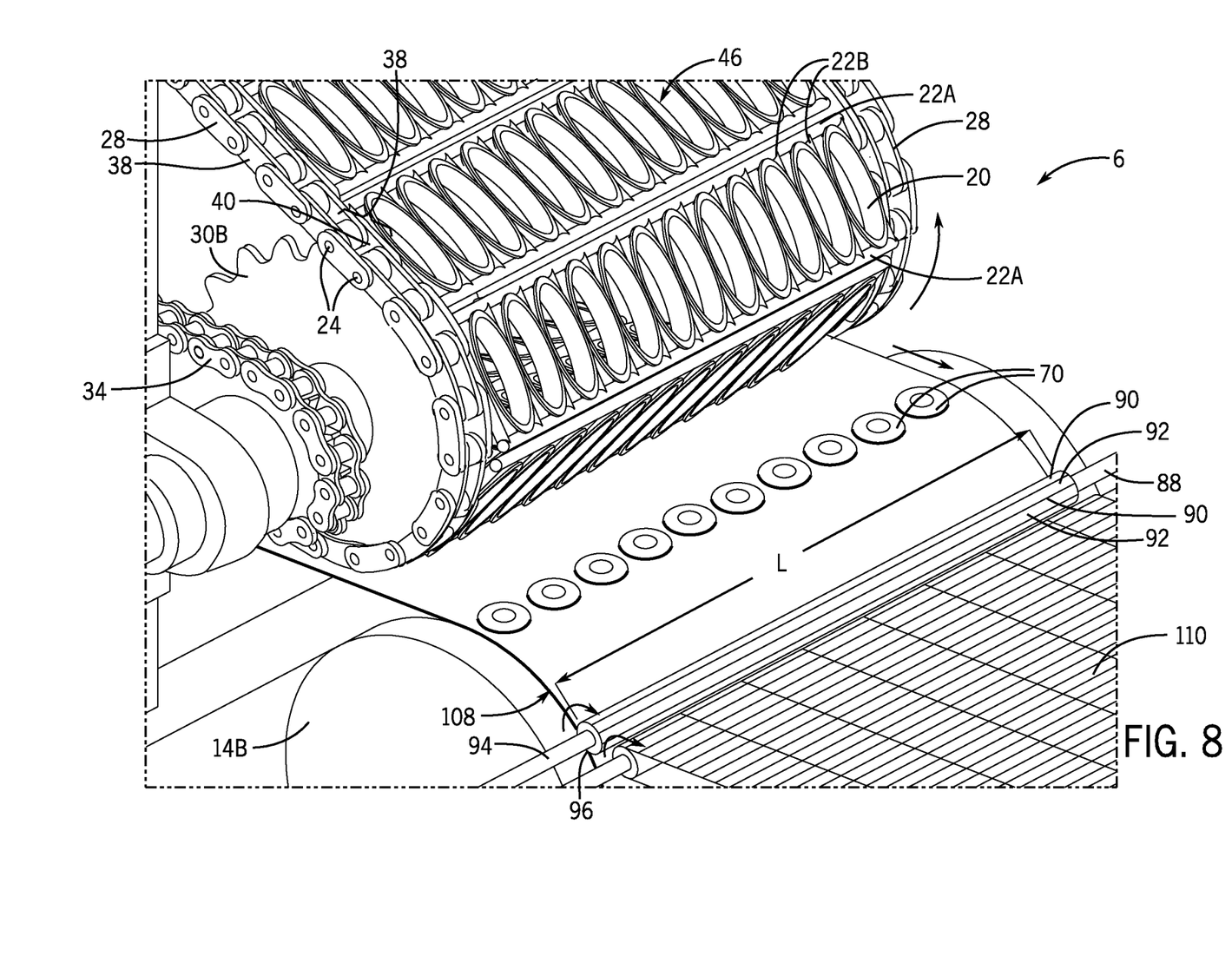
FIG. 8 is a perspective view showing a discharge end of a conveyor system in accordance with the present subject matter.

After cooking, the conveyor system 2 is configured such that the lower conveyor 8 and the upper conveyor 10 are moved apart at the discharge end 6 so that the molds 20 no longer contact the belt 12 (FIG. 8). This separation of the lower and upper conveyors 8, 10 occurs after the food product 70 in the receptacles 64 is moved through the heating system, and in the case of an egg, after the egg is cooked enough to be stable. Removal of the molds 20 leave the eggs in a semi-gelatinous state resting on the PTFE conveyor belt 12, where the residual heat finishes the cooking process. Although the egg is fully cooked by temperature, the yolk is still liquid and the egg white is flexible.

More particularly, the drive chains 28 are deflected up away from the belt 12 by being guided around the discharge end drive roller 30B at the discharge end 6, which pulls the frames 16 and molds 20 away from the belt 12 such that the molds 20 no longer contact the belt 12, and thus leave the heated food product 70 (also referred to herein as "formed product" or "cooked food product") on the belt 12 (FIG. 8). The cooked food product 70 is then further transferred on the surface 66 of the belt 12 in the first direction F.

4. Transfer Roller.

The conveyor system 2 may further include a transfer roller 88. In the case of eggs as the food product 70, removing these from the belt 12 after cooking is problematic and conventional transfer methods do not provide satisfactory results. This is because surface tension created by the moisture in the egg, as well as the texture and flexibility of the egg, causes the egg to adhere to the surface 66 of the belt 12. Because of this problem, the transfer roller 88 has been configured to easily remove the heated food product 70 from the discharge end 6 of the belt 12. The transfer roller 88 includes an outer surface with a series of alternating ridges 90 and grooves 92 that extend along a length L of the transfer roller 88. The transfer roller 88 may include a central rod or roller 94, e.g. a round metal rod or bar (e.g. stainless steel) having a diameter of ½" to 1", or ⅝", with an outer sleeve or sheath 96 surrounding the central roller 94. The outer sleeve 96 may comprise a pliable yet resilient polymer, e.g. molded silicone rubber, and the ridges 90 may extend up from the grooves 92 by 1/16" to ¼", or ⅛". The transfer roller may rotate at a speed as selected by a user, and in a direction as indicated by the arrow in FIG. 9. The transfer roller 88 is arranged at a discharge end 6 of the belt 12, and is configured to remove and transfer the heated food product 70 off of the belt 12. The transfer roller 88 may be arranged at a downward sloped portion 108 of the belt 12 as shown in FIGS. 8-11, which sloped portion 108 is defined as the belt 12 deflects down around the discharge end roller 14B. The rotational axis of the transfer roller 88 may be located below (e.g. 2" below) a horizontal plane defined by the top surface 66 of the belt 12 when in the feed path. This arrangement allows the cooked food product 70 to "drop" or be angled with respect to the direction of gravity and to the transfer roller 88, and thus enables the cooked food product 70 to be lifted and conveyed across the top of the transfer roller 88 to the next conveyor. This configuration however, is not required, and a top of the transfer roller 88 may be arranged co-planar or level with the top surface 66 of the belt 12 to transfer the cooked food product 70 in a level manner to a co-planar discharge conveyor 110. The top of the transfer roller 88 may even be arranged above the top surface 66 of the belt 12 to "lift" the cooked food product 70 off of the top surface 66 of the belt 12 and transfer the cooked food product 70 up to a discharge conveyor 110 located above the top surface 66 of the belt 12.

The ridges 90 on the transfer roller 88 function to lift the cooked food product 70 from the belt 12 surface 66 while maintaining minimal contact with the food product 70. The rotational speed of the transfer roller 88 is adjustable according to the rotational speed of the belt 12. The rotational speed of the transfer roller 88 may be controlled independently from that of the belt 12 so as to allow fine adjustment of the transfer of the food product 70 and inhibit damage to the cooked food product 70. The silicone rubber of the outer sleeve 96 may meet food contact requirements and may be formulated to minimize damage to the cooked food product 70.

5. Discharge Conveyor.

The conveyor system 2 may further include a discharge conveyor 110, which is configured to accept the heated food product 70 from the transfer roller 88 and to move the heated food product 70 along a distance, e.g. away from the belt 12 and transfer roller 88. During this movement, the heated food product 70 may be cooled, either actively or passively. The discharge conveyor 110 is arranged on a side of the transfer roller 88 opposite from the belt 12, and may comprise an open wire mesh conveyor belt that allows air flow through it for cooling the heated food product 70.

6. Active Cooling Mechanism.

The conveyor system 2 may further include an active cooling mechanism 98 through which the heated food product 70 is transferred by the discharge conveyor 110. The active cooling mechanism 98 may cool the food product 70 down to a temperature where it is easily handled by hand and/or is frozen. This cooling may facilitate packaging of the frozen food product 70 for storage or shipment.

7. Washing System.

The conveyor system 2 may further include a washing system for washing the lower conveyor 8 and/or the upper conveyor 10 before they are moved in return paths of the first and second curved paths, along a second direction S to the feed end 4 of the conveyor system 2. The washing system may include a lower washer 100 configured to wash the belt 12 by removing food product pieces, oils, or other deposits that may have been left on the surface 66 of the belt 12 after the food product 70 has been removed from the belt 12 by the transfer roller 88. The lower washer may utilize air, water (e.g. high pressure water nozzles), detergent, heat, light or other cleaning methods to clean the belt 12 of these deposits. The lower washer 100 may be arranged along a lower return path of the first curved path, and below the feed path.

The washing system may also or alternatively include an upper washer 102 configured to wash the frames 16 and molds 20 by removing food product pieces, oils, or other deposits that may have been left on the frames 16 and molds 20 after the frames 16 and molds 20 have been moved away from the belt 12 and the cooked food product 70 thereon. The upper washer 102 may utilize air, water (e.g. high pressure water nozzles), detergent, heat, light or other cleaning methods to clean the frames 16 and molds 20 of these deposits. The upper washer 102 may be arranged along an upper return path of the second curved path, and above the feed path.

The washing system may include, for example, high-pressure nozzles installed in an enclosed space. This enclosed space (box) has slotted openings large enough for the molds 20 to pass into and out of the box. After the molds 20 enter the box, high pressure nozzles shoot water at a high velocity at the molds 20 to remove residue and oil present on the molds 20. The residue is then discharged through a pipe to plant waste-water systems. Following the wash step, the molds 20 may be dried by low-pressure, high-volume air knives positioned to remove residual moisture attached to the molds 20. The molds 20 are then returned to the feed end 4 where a series of parallel, speed-matched sprockets 30A return the molds 20 (by way of the frames 16) to a position to be placed on top of the belt 12 and loaded again with food product 70.

8. Loading Area.

The conveyor system 2 may further include a loading area 104 in which the food product 70 can be loaded into the receptacles 64. With respect to the first direction F, the loading area 104 may be arranged after of the rollers 14A, 30A at the feed end 4 and before the first heating zone 84. Loading of the food product 70 into the receptacles 64 may be automated, or performed manually.

9. Preheating Zone.

The conveyor system 2 may be configured to preheat the molds 20 before the food product 70 is loaded into the receptacles 64. For this purpose, the conveyor system 2 may further include a preheating zone arranged near the feed end 4 of the conveyor system 2. The preheating zone may be arranged, with respect to the second direction S, before the feed end roller 30A at the feed end 4. The preheating zone may be defined by a preheating unit(s) 106, which may include one or more radiant heaters or convection heaters arranged on opposite sides of the frames 16 and molds 20 and heated by a thermal fluid. The preheating unit(s) 106 may be operated at the same temperature as the heating system and may be supplied with the same thermal fluid flow.

Preheating the molds 20 causes the molds 20 to have a higher temperature when they form the receptacles 64 with the belt 12 and when the food product 70 is arranged therein. When the food product 70, e.g. a liquid or semi-liquid food product such as raw eggs, is arranged in the receptacles, the preheated molds 20 sear edges of the food product 70 that is in contact with the molds to cook and solidify almost immediately, and even before the food product 70 is transported through the heating system. This process of heating the contacting portion of the food product creates an initially cooked portion near the contact between the molds 20 and the belt 12, and this cooked portion is solid and forms a dam that inhibits the remainder of the liquid food product from escaping out of the receptacles 64 between the molds 20 and the upper surface 66 of the belt 12.

10. System Operation.

The heating system may produce an even and slow heating of the food product 70, e.g. an egg, which causes a chemical reaction in the egg white and yolk and produces a rubbery egg white and a contained, liquid yolk. A higher temperature in the first heating zone 84 and a lower temperature in the second heating zone 86 allows equilibration of the temperature of the eggs and results in a cooked sunny side up egg.

The conveyor system 2 may be run in a continuous operation in an industrial production setting to heat/cook the food product 70. The conveyor system 2 utilizes molds 20 in the upper conveyor 10 and replaces traditional belting used in prior industrial grill devices. These molds 20 can be fabricated to create the desired shape and size of the cooked food product 70, where the molds 20 define final outer shape of cooked food product 70. The conveyor system 2 according to the invention can be used to manufacture sunny side up eggs, quiche, and omelet products, and other egg-based or non-egg-based food products.

Figure 9:
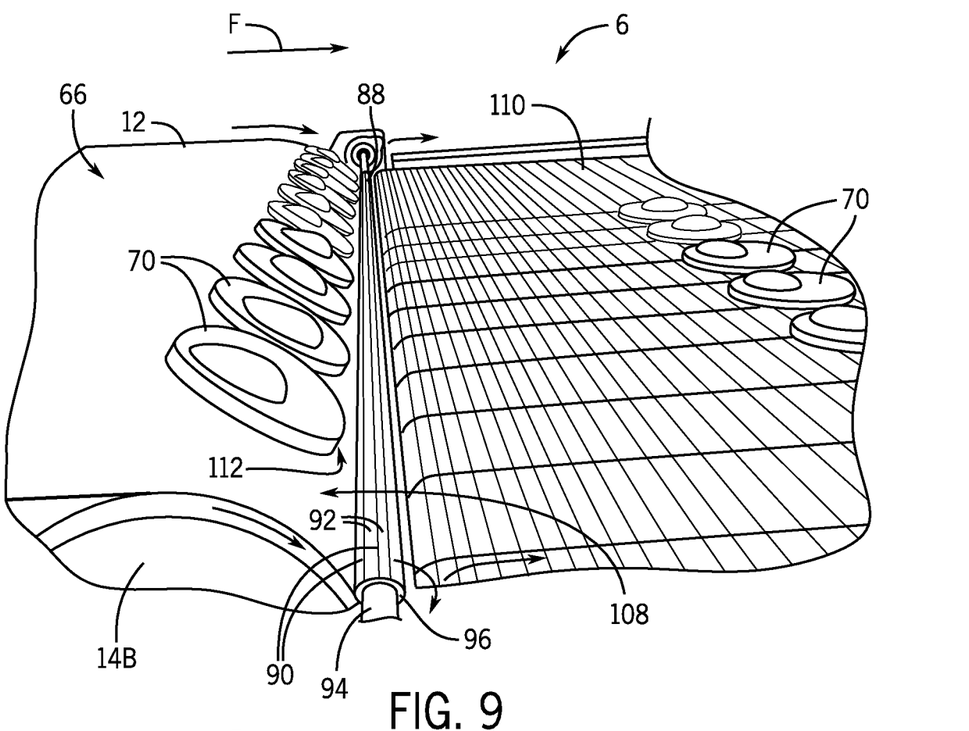
FIG. 9 is a side perspective view showing a transfer operation of a conveyor system in accordance with the present subject matter.
Figure 10:
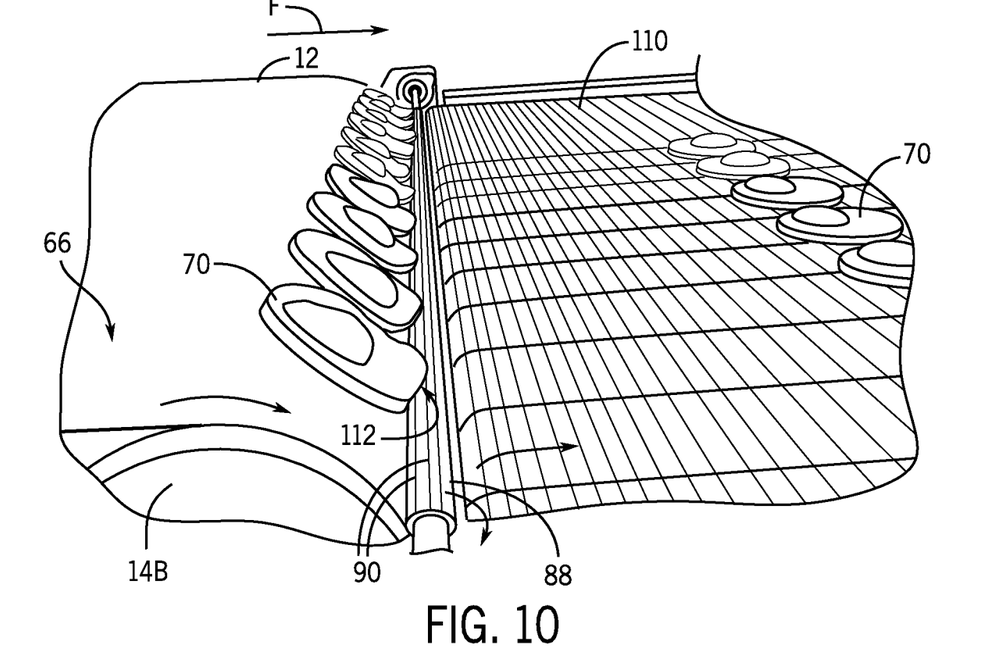
FIG. 10 is a side perspective view showing the transfer operation of FIG. 9 at a later time than shown in FIG. 9.
Figure 11:
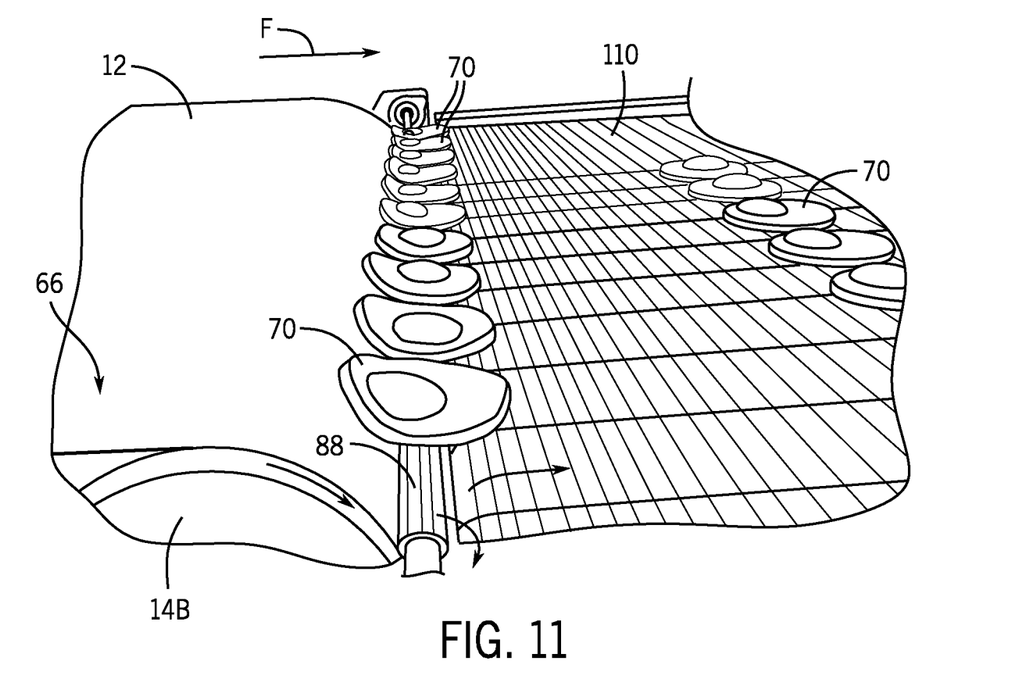
FIG. 11 is a side perspective view showing the transfer operation of FIG. 10 at a later time than shown in FIG. 10.
Figure 12:
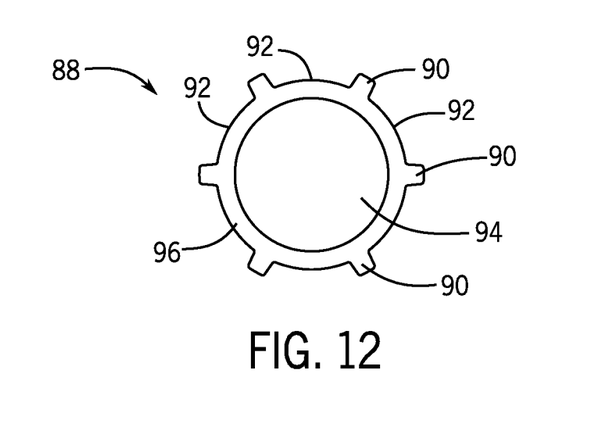
FIG. 12 is a cross-section view of a transfer roller in accordance with the present subject matter.

With reference to FIGS. 9-11 showing a transfer operation of the conveyor system 2, and with respect to sunny side up eggs being the cooked food product 70, depicted are cooked eggs 70 descending the downward sloped portion 108 of the belt 12 around the large diameter discharge end roller 14B. As such, the cooked eggs 70 are sloped at a downward angle rather than being horizontal. The eggs 70 being in this downward sloped orientation allows a leading edge 112 of the eggs 70 to be exposed and facing the transfer roller 88 (FIG. 9). As the eggs 70 are moved further down the downward sloped portion 108, the leading edge 112 of the eggs 70 engage the ridges 90 on the transfer roller 88. The rotating ridges 90 gently engage and lift the front edge 112 of the eggs 70 off of the surface 66 of the belt 12 (FIG. 10). Continued movement of the eggs 70 further down the downward sloped portion 108 and lifting of the eggs 70 by the transfer roller 88 result in guiding of the eggs 70 off the belt 12, up and over the transfer roller 88, on onto the discharge conveyor 110 (FIG. 11) to be conveyed further by the discharge conveyor 110, e.g. to the active cooling mechanism 98.

The system is modifiable in a number of ways to adapt to other products. For example the shape and size of the molds 20 can be changed, the style and material of the belt 12 can be changed, the process of heating the food product 70 can be changed, and the drive of the lower and/or upper conveyors 8, 10 can be modified to fit other requirements.

11. Methods.

The conveyor system 2 may be used in a method of preparing a cooked food product 70. The method may include providing the conveyor system 2, and moving the frames 16 such that the open bottom 46 of each of the molds 20 contacts the belt 12 to thereby form a plurality of receptacles 64.

The food product 70, e.g. raw eggs, is then arranged in the receptacles 64. This may be accomplished by hand, or via an automated method. The food product 70 may fill the receptacles 64 so as to contact the inner surface 68 of the molds 20. The molds 20 may be preheated before the food product 70 is arranged in the receptacles 64, and thus a portion of the food product 70 in contact with the molds 20 may be seared.

The receptacles 64 and food product 70 are then moved in the feed path to the heating system. The heating system heats (i.e. cooks) the food product 70 while in the receptacles 64, which receptacles provide a shape to the food product 70 during cooking. The food product 70 may include a plurality of raw eggs, the cooked food product 70 may include a plurality of cooked eggs, one of the plurality of raw eggs may be arranged in each of the receptacles 64, and each of the molds 20 may provide a shape to one of the cooked eggs.

Cooking may include heating the food product 70 from above with thermal radiation, and heating the food product 70 from below using thermal conduction. Cooking may include moving the food product 70 in the receptacles 64 through the first heating zone 84 and then through the second heating zone 86 of the heating system, where the first heating zone 84 has a higher temperature than the second heating zone 86.

After cooking, the frames 16 are moved such that the molds 20 no longer contact the belt 12. The frames 16 may be lifted up away from the belt 12, which continues to move in a horizontal direction, thereby leaving the cooked food product 70 on the belt 12. The cooked food product 70 is them transferred off of the belt 12 using the transfer roller 88.

The cooked food product 70 may be transferred onto the discharge conveyor 110 using the transfer roller 88, and actively or passively cooled on the discharge conveyor 110, e.g. by using the active cooling mechanism 98. The cooked food product 70 may be subject to other processes, before or after cooling, in order to further modify the food product 70, and these may include for example, further heating (e.g. by radiation or heated air), addition of coloring, drying, etc. A further heating step may include using radiant heaters arranged above the discharge conveyor to fully cook the food product, such as having a completely cooked food product that is entirely solid as opposed to having a sunny side up egg with a liquid yolk.

The belt 12 and/or the molds 20 may be washed after the cooked food product 70 is transferred off of the belt 12.

The foregoing and other features of the invention set forth in detail certain illustrative embodiments of the invention, these being indicative, however, of but a few of the various ways in which the principles of the present invention may be employed.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A conveyor system comprising:
  a drive chain including links;
  a frame driven by the drive chain, and including two spaced-apart lateral bars connected by a series of longitudinal bars, the frame including two studs extending from a first longitudinal bar of the longitudinal bars; and
  a connection system removably connecting the frame to the drive chain, and including an upper clamp, a lower clamp, a plate removably connected to the upper clamp, and pins extending from the plate and connecting the links together, the upper clamp and the lower clamp being secured to the frame by being clamped around the first longitudinal bar and the two studs.

2. The conveyor system according to claim 1, wherein:
  the upper clamp and the lower clamp each include mated grooves that collectively form tunnels; and
  the first longitudinal bar and the two studs are arranged in the tunnels.

3. The conveyor system according to claim 2, wherein the upper clamp and the lower clamp are clamped around the first longitudinal bar and the two studs with four clamping screws extending through the upper clamp and threaded into the lower clamp.

4. The conveyor system according to claim 1, wherein:
  the plate includes an upper horizontal section and a lower vertical section;
  the pins extend out from the lower vertical section; and
  the plate is removably connected to the upper clamp by two mounting screws extending through the upper horizontal section an threaded into the upper clamp.

5. The conveyor system according to claim 1, wherein:
the frame defines square openings;
the conveyor system further includes rings moveably held within the openings, each of the rings defining an open top and an open bottom;
each of the rings includes an endless round vertical side wall defining the open top and the open bottom, a top flange, and a bottom flange, the top flange and the bottom flange extending horizontally out from the vertical side wall to thereby define an annular groove around an outside of each of the rings; and
some of the lateral bars and longitudinal bars are arranged at least partially within the annular groove of each of the rings to thereby moveably hold the rings within the openings.

6. The conveyor system according to claim 5, wherein:
the conveyor system is a conveyor system for heating a food product;
the conveyor system further includes a feed end and an opposite discharge end, a belt movable in a first direction from the feed end toward the discharge end, and a heating system configured to heat the food product;
the drive chain moves the frame in the first direction and brings the rings into contact with the belt such that the open bottom of each of the rings contacts the belt so as to define a receptacle between each of the rings and the belt; and
the receptacle is configured to contain the food product during heating of the food product and to provide a shape to the heated food product.

7. The conveyor system according to claim 6, wherein each of the openings have a square shape.

8. The conveyor system according to claim 6, wherein:
the heating system includes a thermal radiation unit arranged above the food product in the receptacles, and a thermal conduction unit arranged below the food product in the receptacles;
the heating system includes a first heating zone and a second heating zone,
the first heating zone has a higher temperature than the second heating zone, and
the first heating zone is before the second heating zone with respect to the first direction.

9. The conveyor system according to claim 6, wherein:
the conveyor system further includes a transfer roller arranged at the discharge end, configured to remove the heated food product from the belt,
the transfer roller comprises a series of alternating ridges and grooves extending along a length of the transfer roller, and
the transfer roller is arranged on a downward sloped portion of the belt.

10. The conveyor system according to claim 9, further comprising:
a discharge conveyor arranged on a side of the transfer roller opposite from the belt, and configured to accept the heated food product from the transfer roller and move the heated food product along a distance, and
an active cooling mechanism that is configured to actively cool the heated food product when the heated food product is on the discharge conveyor.

11. The conveyor system according to claim 6, wherein:
the conveyor further includes two drive chains directed by guides and operatively connected to the frame on opposite sides of the frame, the two drive chains being configured to move the frame in the first direction,
the frame includes pins on lateral ends of the frame, the pins are incorporated as link pins in the two drive chains; and
at the discharge end, the guides direct the drive chains upward away from the belt such that the frame and molds are moved away from the belt, the open bottom of each of the molds no longer contacts the belt, and the heated food product remains on the belt.

12. The conveyor system according to claim 11, wherein:
the belt is an endless belt that is configured to rotate around a first curved path between the feed end and the discharge end;
the drive chains are endless drive chains configured to rotate around a second curved path between the feed end and the discharge end;
further including a preheating zone configured to preheat the molds before the food product is contained in the receptacle.

13. The conveyor system according to claim 11, further including a washing system configured to wash the molds and the belt after the guides direct the drive chains upward away from the belt.

14. The conveyor system according to claim 6, wherein surfaces of the molds include polytetrafluoroethylene.

15. A method of performing maintenance on a frame of a conveyor system, the conveyor system including:
a drive chain including links;
the frame driven by the drive chain, the frame including two spaced-apart lateral bars connected by a series of longitudinal bars, and two studs extending from a first longitudinal bar of the longitudinal bars; and
a connection system removably connecting the frame to the drive chain, and including an upper clamp, a lower clamp, a plate removably connected to the upper clamp, and pins extending from the plate and connecting the links together, the upper clamp and the lower clamp being secured to the frame by being clamped around the first longitudinal bar and the two studs;
the method including:
disconnecting the plate from the upper clamp;
removing the frame from the conveyor system;
performing maintenance on the frame; and
replacing the frame to the conveyor system by reconnecting the plate to the upper clamp.

16. The method according to claim 15, wherein:
the plate includes an upper horizontal section and a lower vertical section;
the pins extend out from the lower vertical section;
the plate is removably connected to the upper clamp by two mounting screws extending through the upper horizontal section an threaded into the upper clamp; and
disconnecting the plate from the upper clamp includes unscrewing the two mounting screws.

17. The method according to claim 16, wherein:
the upper clamp and the lower clamp each include mated grooves that collectively form tunnels;
the first longitudinal bar and the two studs are arranged in the tunnels; and
the upper clamp and the lower clamp are clamped around the first longitudinal bar and the two studs with four clamping screws extending through the upper clamp and threaded into the lower clamp.

18. The method according to claim 17, wherein:
the conveyor system is a conveyor system for heating a food product; and
the performing maintenance on the frame includes replacing a mold of the frame in which the food product is heated with a new mold.

19. The method according to claim 15, wherein:
the upper clamp and the lower clamp are clamped around the first longitudinal bar and the two studs with four clamping screws extending through the upper clamp and threaded into the lower clamp; and
the performing maintenance on the frame includes tightening the four clamping screws.

20. The method according to claim 15, wherein the performing maintenance on the frame includes washing the frame.

\* \* \* \* \*